United States Patent
Surti et al.

(10) Patent No.: US 9,984,430 B2
(45) Date of Patent: May 29, 2018

(54) ORDERING THREADS AS GROUPS IN A MULTI-THREADED, MULTI-CORE GRAPHICS COMPUTE SYSTEM

(71) Applicant: Intel Corporation, Santa Clara, CA (US)

(72) Inventors: Prasoonkumar Surti, Folsom, CA (US); Thomas A. Piazza, Granite Bay, CA (US)

(73) Assignee: Intel Corporation, Santa Clara, CA (US)

( * ) Notice: Subject to any disclaimer, the term of this patent is extended or adjusted under 35 U.S.C. 154(b) by 172 days.

(21) Appl. No.: 13/862,542

(22) Filed: Apr. 15, 2013

(65) Prior Publication Data

US 2014/0306970 A1  Oct. 16, 2014

(51) Int. Cl.
*G06T 1/20* (2006.01)
*G06F 9/38* (2018.01)

(52) U.S. Cl.
CPC .............. *G06T 1/20* (2013.01); *G06F 9/3838* (2013.01); *G06F 9/3851* (2013.01)

(58) Field of Classification Search
CPC ....... G06F 15/00–15/005; G06T 1/00–1/0092; G06T 1/60; G06T 15/00
USPC ......................................... 345/501, 522, 530
See application file for complete search history.

(56) References Cited

U.S. PATENT DOCUMENTS

| | | | | |
|---|---|---|---|---|
| 7,434,032 | B1 * | 10/2008 | Coon et al. ................... | 712/217 |
| 7,526,634 | B1 * | 4/2009 | Duluk, Jr. ................ | G06F 9/52 712/216 |
| 7,594,095 | B1 * | 9/2009 | Nordquist ............ | G06F 9/4843 712/22 |
| 7,671,862 | B1 * | 3/2010 | Patel et al. ..................... | 345/501 |
| 8,081,184 | B1 * | 12/2011 | Nordquist ............. | G06T 15/005 345/426 |
| 8,209,702 | B1 * | 6/2012 | Roytman .............. | G06F 9/5027 718/106 |
| 8,601,485 | B2 * | 12/2013 | Engh-Halstvedt .... | G06F 9/4881 345/418 |
| 2006/0179281 | A1 * | 8/2006 | Jensen ................... | G06F 9/3836 712/214 |
| 2009/0049451 | A1 * | 2/2009 | Bates ............................ | 718/108 |
| 2009/0300238 | A1 * | 12/2009 | Panabaker et al. ............. | 710/62 |
| 2009/0327662 | A1 * | 12/2009 | Jiang et al. .................... | 712/217 |
| 2010/0031268 | A1 * | 2/2010 | Dwyer .................. | G06F 9/3836 718/106 |
| 2013/0160023 | A1 * | 6/2013 | Suzuki et al. ................ | 718/104 |
| 2014/0282566 | A1 * | 9/2014 | Lindholm ............... | G06F 9/522 718/102 |
| 2014/0285500 | A1 * | 9/2014 | Lindholm ................. | G06T 1/20 345/506 |

* cited by examiner

*Primary Examiner* — Jacinta M Crawford
(74) *Attorney, Agent, or Firm* — Trop Pruner & Hu, P.C.

(57) ABSTRACT

A scoreboard may keep track of thread dependencies. A set of threads with a common characteristic may be grouped so that if that characteristic is changed, the group of threads can be accessed to account for that change. Examples for such a characteristic include various types of scoreboard address changes. When the characteristic is changed the group of threads are used to identify threads affected by the characteristic change.

24 Claims, 4 Drawing Sheets

ORDERING THREADS AS GROUPS IN A MULTI-THREADED, MULTI-CORE GRAPHICS COMPUTE SYSTEM

BACKGROUND

This relates generally to graphics processing.

A pixel shader dispatch uses a pixel shader scoreboard to maintain an order of critical sections of threads. A pixel shader dispatch sends quads of pixels through quad pixel shader units, processing pixel shader passes for all quads in a batch. A thread critical section is a part of a thread that requires ordering for data consistency. A critical section needs to wait for the result from a result producing thread to complete execution of that critical section.

A pixel shader scoreboard uses coordinates corresponding to corners of pixel quads. For example a scoreboard could use eight x,y coordinates of eight upper left corners of quads of 2×2 pixel blocks sometimes called subspans.

Presently only one critical section is allowed per thread. When dispatching a pixel shader thread, each quad's x,y coordinates may be used to generate a unique scoreboard address which is equal to hash_func(x,y). Also each pixel shader thread may have a unique pixel shader thread identifier. A thread dependency register may be used to keep track of the thread that each quad is dependent on. For example, if there are eight pixel quads, then there are eight such dependencies, and there may be eight thread dependency registers for each pixel shader thread. A thread dependency register may record a valid pixel shader thread identifier to indicate what thread a quad depends on. Normally an active thread dependency register has a valid bit set for that register.

When previous threads retire because their critical sections have been fully executed, guaranteeing a correct order of the dependent pixel shader thread, the thread dependency register is cleared. The dependent pixel shader thread may then wait until all the thread dependency registers are cleared before executing a critical section.

There are cases when a system for graphics processing changes the hash function (hash_func) to generate the scoreboard address or there is a change in the interpretation of the address coordinates. One example is a decoupled pixel shader whose shading ratio causes a change in the x,y coordinates and potentially in the hash function. If the shading or ratio changes on a per triangle basis, an inefficiency may be introduced into the system.

When the hash function changes, tracking dependency based on the scoreboard mechanism creates hazards such as not marking a true dependency or marking a false dependency. These hazards may result in incoherent data. In order to avoid these hazards, one could stall the scoreboard lookup stage until all threads retire before changing the scoreboard hash function or changing the x,y space. But this stall creates an inefficiency in feeding the execution units and a loss in performance or wasted power. When the hash function or x,y space changes often, such a stall can create a performance breakdown point.

BRIEF DESCRIPTION OF THE DRAWINGS

Some embodiments are described with respect to the following figures.

DETAILED DESCRIPTION

Figure 1:
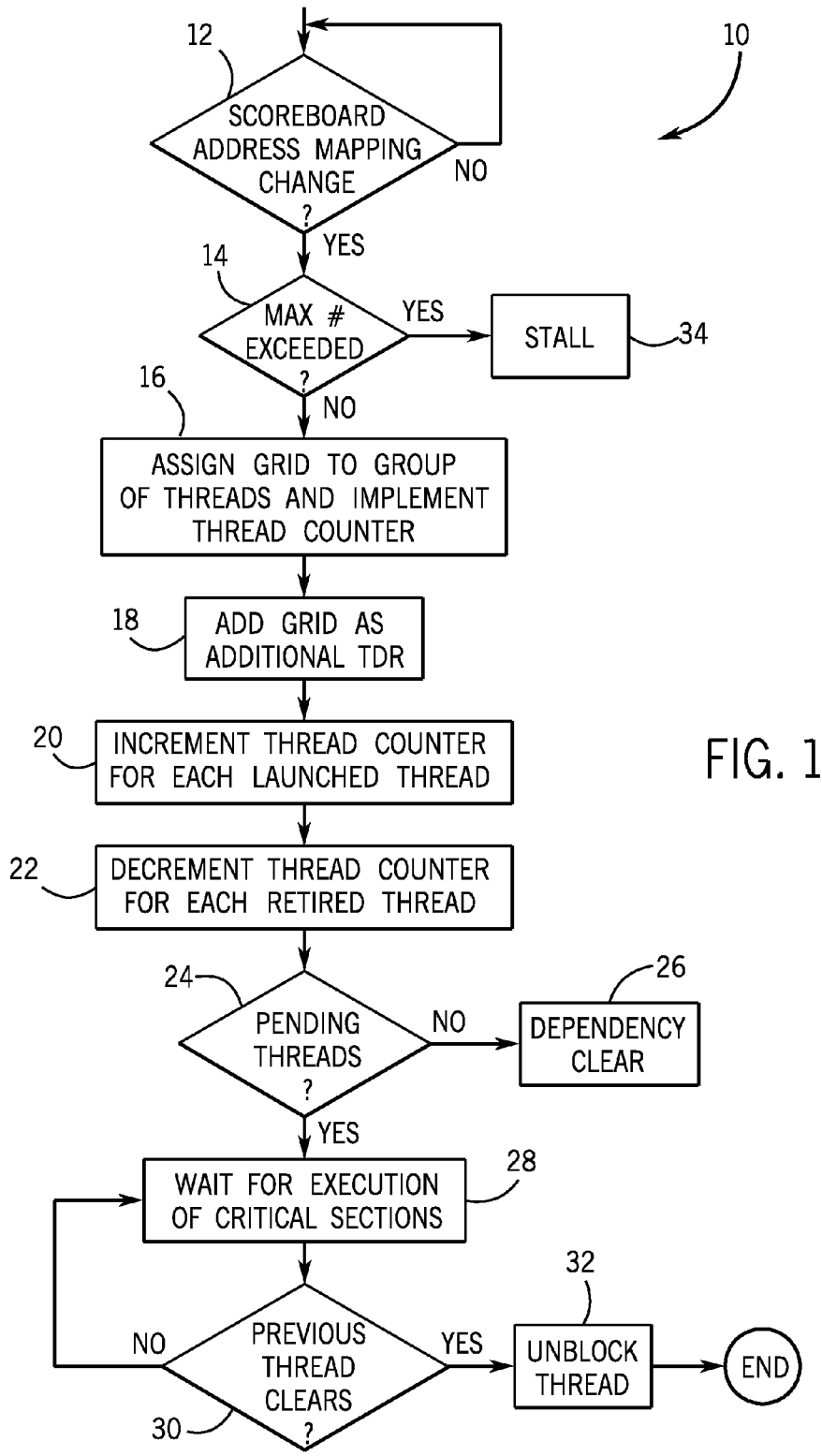
FIG. 1 is a flow chart for one embodiment.

A scoreboard may keep track of thread dependencies. A set of threads with a common characteristic may be grouped so that if that characteristic is changed, the group of threads can be accessed to account for that change. Examples for such a characteristic include various types of scoreboard address changes. When the characteristic is changed, the group of threads is used to identify threads affected by the characteristic change.

A group of threads that have the same hash function and (x,y) space coordinates gets a unique group identifier called a (GRID). Depending on how many changes in the scoreboard address mapping are allowed in a given system, the number of bits in a GRID is determined. A GRID may be added as an additional dependency register in each pixel shader thread. Thus, in an example with eight thread dependency registers, the GRID becomes the ninth thread dependency register.

The pixel shader dispatch generates a unique GRID for a group of threads at every change in the scoreboard address mapping. Each GRID may be marked as being dependent on the previous GRID. The pixel shader dispatch may be part of a pixel shader. The pixel shader dispatch is a hardware function that invokes pixel shaders on the execution units. It could be used in either OpenGL or DirectX or any other proprietary API that allows image processing.

The pixel shader dispatch tracks a number of outstanding threads belonging to each GRID. When there are no pending threads on a given GRID, a dependency clear is broadcast from the pixel shader dispatch to all execution units.

The scoreboard may store a GRID with each thread identifier. While looking up a scoreboard address, if a previous thread identifier on that scoreboard address belongs to a different GRID, the dependency is not marked. Hence, in some embodiments up to eight dependencies are tracked only within the same GRID. Then the GRID may be part of a content addressable memory that exists to mark dependency on the in-flight quads from lookup to execution units. All the threads whose GRID thread dependency registers are not cleared, wait to execute their critical sections. A previous GRID's dependency clear unblocks those threads. This mechanism allows pipelining of scoreboard address mapping changes all the way to the execution units without stalling the pixel shader scoreboard lookup in some embodiments.

In the following, a non-limiting implementation example is provided. GRID allocation is implemented by the pixel shader dispatch in some embodiments. On each scoreboard address mapping change, a new GRID is created automatically. If the maximum number of allowable GRIDs are already outstanding then the pixel shader dispatch stalls. The maximum number of GRIDs in each pixel shader dispatch is the maximum thread identifier for a given configuration in some embodiments.

GRID allocation in the pixel shader dispatch may be counter based in one embodiment. The current counter value may represent the current GRID.

A GRID can be stored in a scoreboard random access memory with each thread identifier that a subspan is dependent on. As another example, the GRID may be stored with each thread identifier in a processing graphics random access memory. When looking up dependency, whether to mark a dependency, depends on whether the current GRID and the corresponding scoreboard address's valid thread identifier's GRID. If both of those GRIDs are the same, the dependency is marked and the thread dependency register is populated with the appropriate data.

A pixel shader dispatch may create a ninth thread dependency register with a previous GRID and a valid bit is set after making sure that the previous GRID has a non-zero number of outstanding pixel threads. If the previous GRID's outstanding number of threads is zero, the ninth thread dependency register is marked as invalid because it has no dependencies.

The pixel shader dispatch implements an outstanding thread counter with each GRID. This counter may be incremented for every thread launched with that GRID and decremented when a pixel shader thread identifier retires with that GRID.

When a given GRID's outstanding thread counter becomes zero, that GRID is broadcast by the pixel shader dispatch to the thread dispatcher (TDL) to clear the ninth thread dependency registers in the pending threads in the TDL and in the execution units. The thread dispatcher may be a hardware device that launches threads onto multi-thread and multi-core computing engines.

When the pixel shader dispatch gets a thread retirement, it may look up the GRID corresponding to the retiring pixel shader thread identifier so that the appropriate outstanding thread counter can be decremented.

If the pixel shader dispatch broadcasts a thread dependency register clear, an additional bit may be added to distinguish between the pixel shader identifier and the GRID.

A mechanism to pass information from the thread dispatch to the thread retirement may use information on clearing the scoreboard. Based on the GRID, a unique mapping or hash function may be used.

In accordance with some embodiments a sequence for allowing address change mapping may be implemented in software, firmware and/or hardware. In software and firmware embodiments, it may be implemented by computer executed instructions stored in one or more non-transitory computer readable media such as magnetic, optical or semiconductor storages.

The sequence 10, illustrated in FIG. 1, begins by receiving an indication of a scoreboard address mapping change, as indicated in diamond 12, in one embodiment. A check at diamond 14 determines whether the maximum number of GRIDs has been exceeded. If so, the flow stalls, as indicated in block 34, and waits for the retirement of a GRID so that a new GRID may be assigned.

If the maximum number of GRIDs has not been exceeded as determined in diamond 14, a GRID is assigned to a group of threads and a thread counter may be implemented, as indicated in block 16. Then the GRID may be added as an additional thread dependency register, as indicated in block 18.

In block 20, the thread counter is incremented for each launched thread. In block 22, the thread counter is decremented for each retired thread.

A check at diamond 24 determines whether there are any pending threads. In one embodiment this may be determined based on the thread count for a different GRID. If there are no pending threads, then a dependency clear is issued, as indicated in block 26.

Otherwise, the flow waits for execution of critical sections, as indicated in block 28. A check at diamond 30 determines whether a previous thread clears. If not, the flow continues to wait. Otherwise, any thread whose execution was dependent on execution of the cleared thread may be unblocked, as indicated in block 32.

Figure 2:
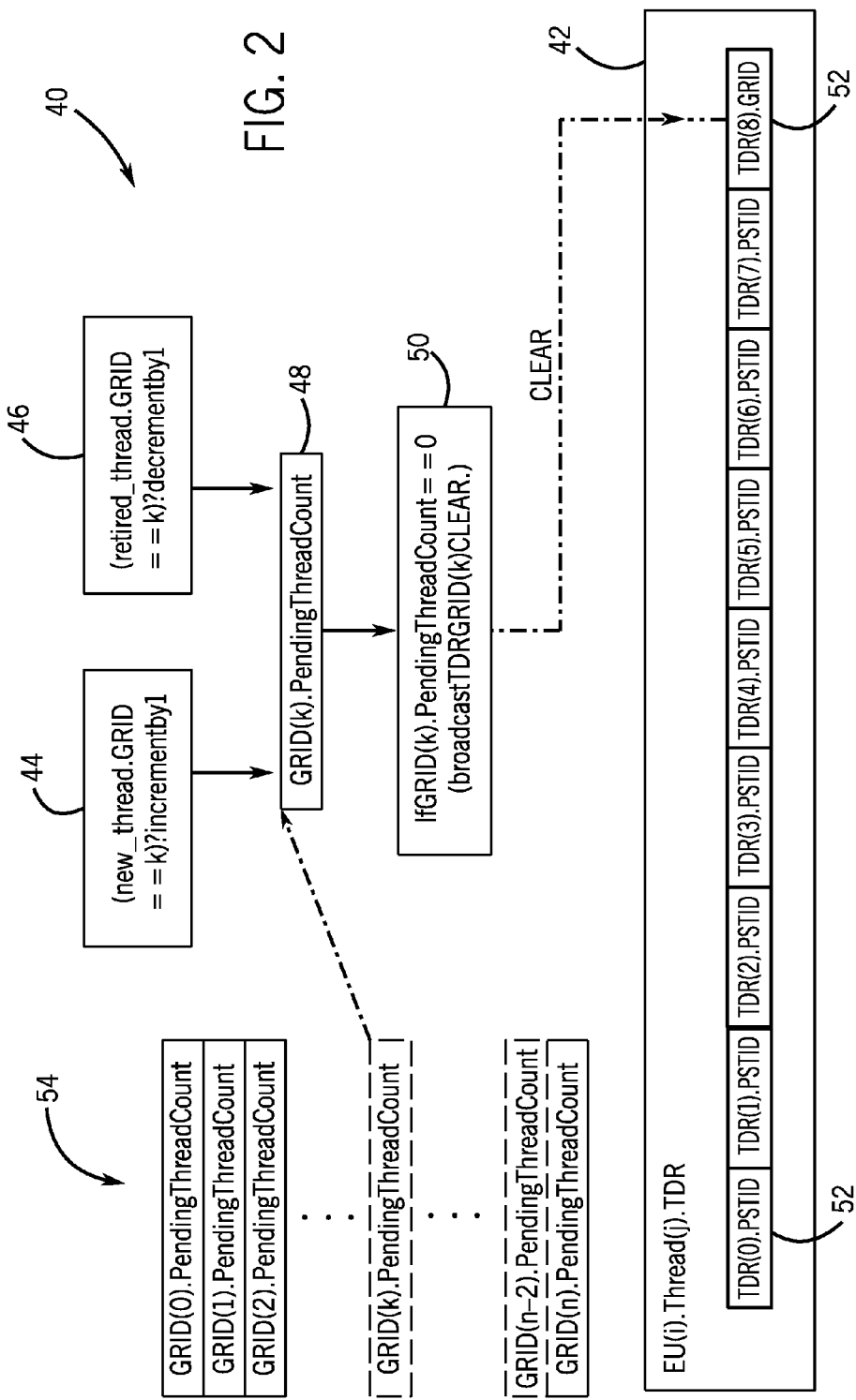
FIG. 2 is a depiction of an execution unit according to one embodiment.

The sequence shown in FIG. 1 may be executed by the execution unit (EU) 42 shown in FIG. 2. The execution unit 42 may include thread dependency registers 52. Thread dependency registers 0 through 7 include the pixel shader thread identifiers (PSTID). The last thread dependency register, TDR (eight) includes the GRID.

Block 44 supplies a new thread increment-by-one signal to the thread counter 48. The block 46 sends a decrement by one signal to the thread count 48 for a retired thread. The output of the thread count 48 is supplied to a device 50 that checks whether there are still pending threads. If there are no pending threads then a clear signal is sent to the thread dependency register 8 that stores the GRID.

Registers 54 are provided for each GRID and store the pending thread count for each GRID. The thread count for a GRID may be supplied to the thread counter 48 when a thread count change (increment or decrement) is received for a given GRID.

Figure 3:
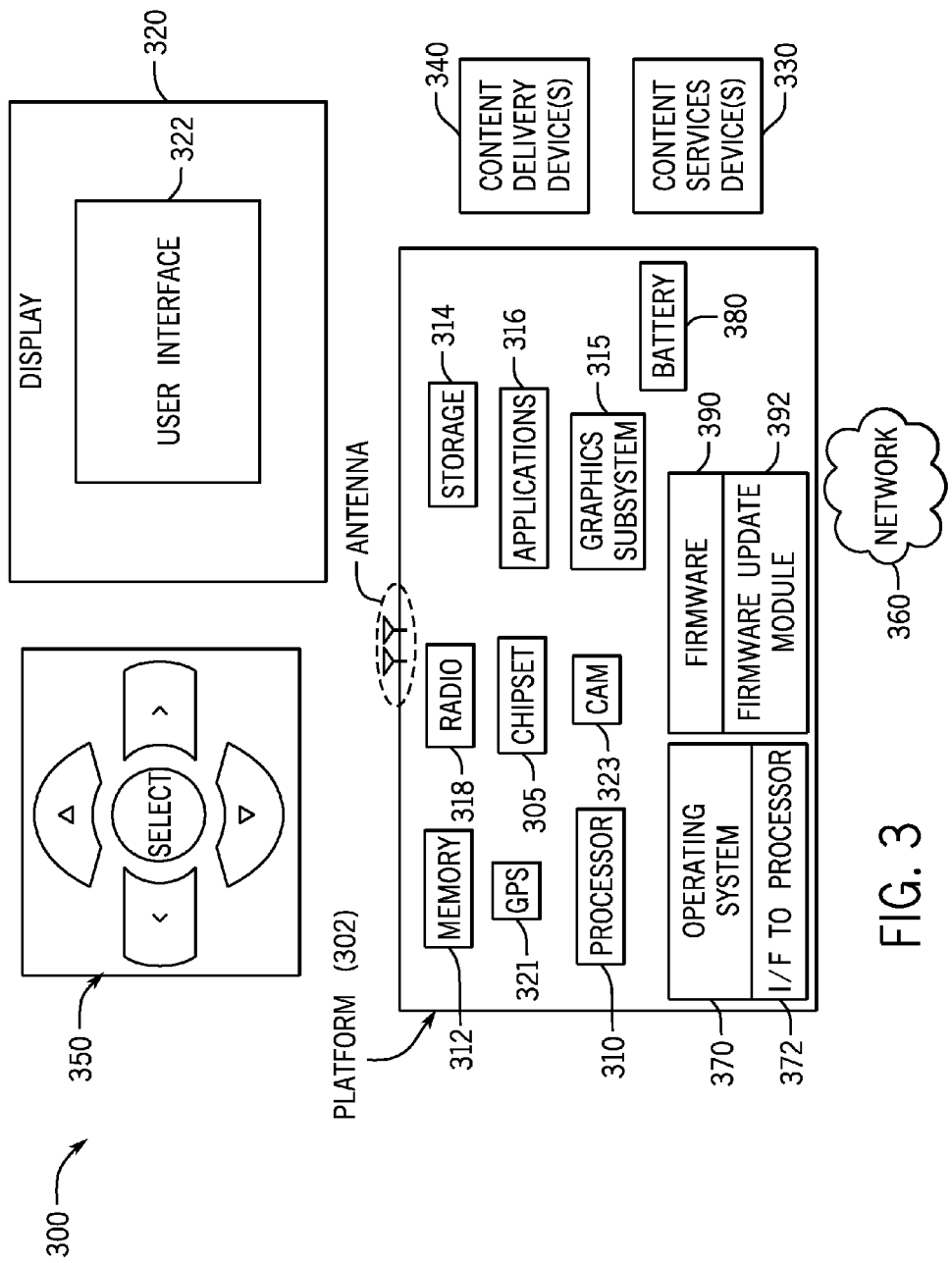
FIG. 3 is a system depiction for one embodiment.

FIG. 3 illustrates an embodiment of a system 300. In embodiments, system 300 may be a media system although system 300 is not limited to this context. For example, system 300 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 300 comprises a platform 302 coupled to a display 320. Platform 302 may receive content from a content device such as content services device(s) 330 or content delivery device(s) 340 or other similar content sources. A navigation controller 350 comprising one or more navigation features may be used to interact with, for example, platform 302 and/or display 320. Each of these components is described in more detail below.

In embodiments, platform 302 may comprise any combination of a chipset 305, processor 310, memory 312, storage 314, graphics subsystem 315, applications 316 and/or radio 318. Chipset 305 may provide intercommunication among processor 310, memory 312, storage 314, graphics subsystem 315, applications 316 and/or radio 318. For example, chipset 305 may include a storage adapter (not depicted) capable of providing intercommunication with storage 314.

Processor 310 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 310 may comprise dual-core processor(s), dual-core mobile processor(s), and so forth. The processor may implement the sequence of FIG. 1, together with memory 312.

Memory 312 may be implemented as a volatile memory device such as, but not limited to, a Random Access Memory (RAM), Dynamic Random Access Memory (DRAM), or Static RAM (SRAM).

Storage 314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 314 may comprise technology to increase the storage performance enhanced protection for valuable digital media when multiple hard drives are included, for example.

Graphics subsystem 315 may perform processing of images such as still or video for display. Graphics subsystem 315 may be a graphics processing unit (GPU) or a visual processing unit (VPU), for example. An analog or digital interface may be used to communicatively couple graphics subsystem 315 and display 320. For example, the interface may be any of a High-Definition Multimedia Interface, DisplayPort, wireless HDMI, and/or wireless HD compliant techniques. Graphics subsystem 315 could be integrated into processor 310 or chipset 305. Graphics subsystem 315 could be a stand-alone card communicatively coupled to chipset 305.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 318 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 318 may operate in accordance with one or more applicable standards in any version.

In embodiments, display 320 may comprise any television type monitor or display. Display 320 may comprise, for example, a computer display screen, touch screen display, video monitor, television-like device, and/or a television. Display 320 may be digital and/or analog. In embodiments, display 320 may be a holographic display. Also, display 320 may be a transparent surface that may receive a visual projection. Such projections may convey various forms of information, images, and/or objects. For example, such projections may be a visual overlay for a mobile augmented reality (MAR) application. Under the control of one or more software applications 316, platform 302 may display user interface 322 on display 320.

In embodiments, content services device(s) 330 may be hosted by any national, international and/or independent service and thus accessible to platform 302 via the Internet, for example. Content services device(s) 330 may be coupled to platform 302 and/or to display 320. Platform 302 and/or content services device(s) 330 may be coupled to a network 360 to communicate (e.g., send and/or receive) media information to and from network 360. Content delivery device(s) 340 also may be coupled to platform 302 and/or to display 320.

In embodiments, content services device(s) 330 may comprise a cable television box, personal computer, network, telephone, Internet enabled devices or appliance capable of delivering digital information and/or content, and any other similar device capable of unidirectionally or bidirectionally communicating content between content providers and platform 302 and/or display 320, via network 360 or directly. It will be appreciated that the content may be communicated unidirectionally and/or bidirectionally to and from any one of the components in system 300 and a content provider via network 360. Examples of content may include any media information including, for example, video, music, medical and gaming information, and so forth.

Content services device(s) 330 receives content such as cable television programming including media information, digital information, and/or other content. Examples of content providers may include any cable or satellite television or radio or Internet content providers. The provided examples are not meant to limit embodiments of the invention.

In embodiments, platform 302 may receive control signals from navigation controller 350 having one or more navigation features. The navigation features of controller 350 may be used to interact with user interface 322, for example. In embodiments, navigation controller 350 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 350 may be echoed on a display (e.g., display 320) by movements of a pointer, cursor, focus ring, or other visual indicators displayed on the display. For example, under the control of software applications 316, the navigation features located on navigation controller 350 may be mapped to virtual navigation features displayed on user interface 322, for example. In embodiments, controller 350 may not be a separate component but integrated into platform 302 and/or display 320. Embodiments, however, are not limited to the elements or in the context shown or described herein.

In embodiments, drivers (not shown) may comprise technology to enable users to instantly turn on and off platform 302 like a television with the touch of a button after initial boot-up, when enabled, for example. Program logic may allow platform 302 to stream content to media adaptors or other content services device(s) 330 or content delivery device(s) 340 when the platform is turned "off." In addition, chip set 305 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 300 may be integrated. For example, platform 302 and content services device(s) 330 may be integrated, or platform 302 and content delivery device(s) 340 may be integrated, or platform 302, content services device(s) 330, and content delivery device(s) 340 may be integrated, for example. In various embodiments, platform 302 and display 320 may be an integrated unit. Display 320 and content service device(s) 330 may be integrated, or display 320 and content delivery device(s) 340 may be integrated, for example. These examples are not meant to limit the invention.

In various embodiments, system 300 may be implemented as a wireless system, a wired system, or a combination of both. When implemented as a wireless system, system 300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 3.

Figure 4:
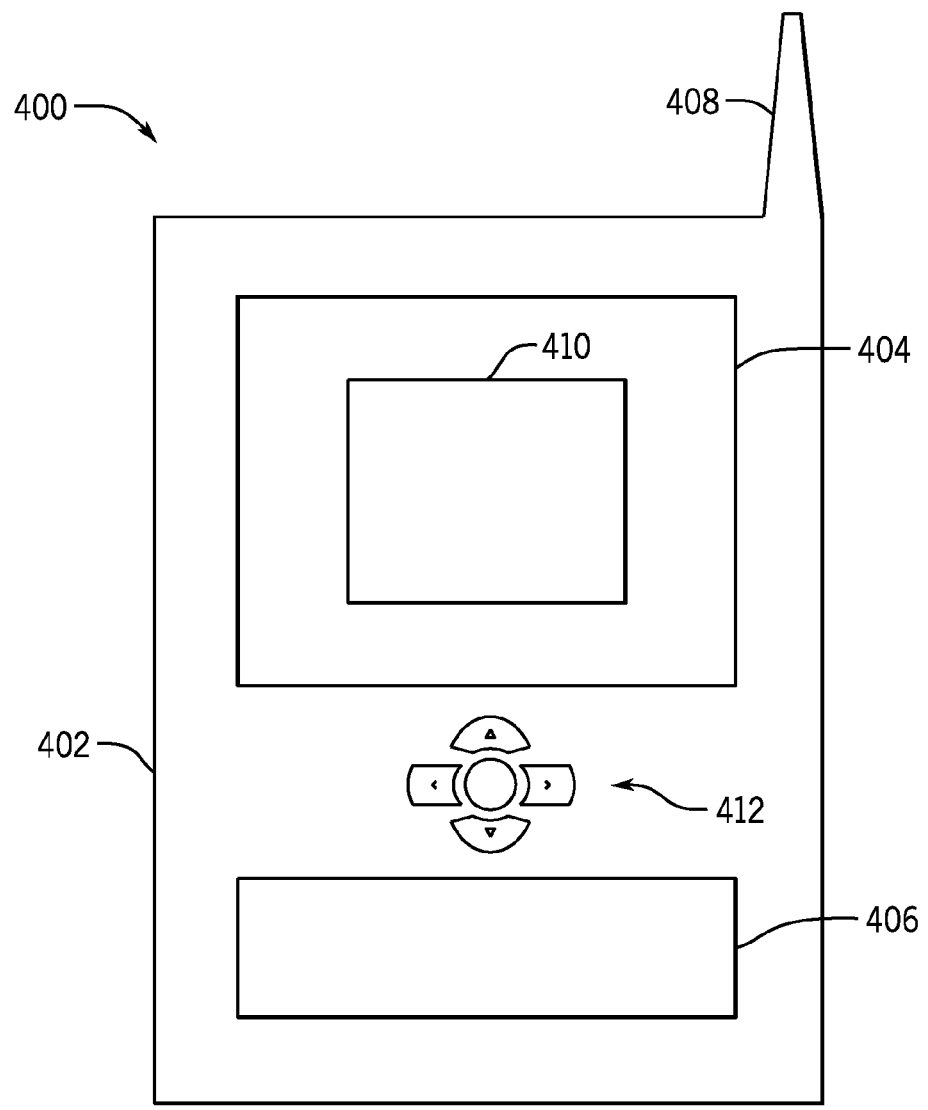
FIG. 4 is a front elevational view for one embodiment.

As described above, system 300 may be embodied in varying physical styles or form factors. FIG. 4 illustrates embodiments of a small form factor device 400 in which system 300 may be embodied. In embodiments, for example, device 400 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The processor 310 may communicate with a camera 322 and a global positioning system sensor 320, in some embodiments. A memory 312, coupled to the processor 310, may store computer readable instructions for implementing the sequences shown in FIG. 2 in software and/or firmware embodiments.

As shown in FIG. 4, device 400 may comprise a housing 402, a display 404, an input/output (I/O) device 406, and an antenna 408. Device 400 also may comprise navigation features 412. Display 404 may comprise any suitable display unit for displaying information appropriate for a mobile computing device. I/O device 406 may comprise any suitable I/O device for entering information into a mobile computing device. Examples for I/O device 406 may include an alphanumeric keyboard, a numeric keypad, a touch pad, input keys, buttons, switches, rocker switches, microphones, speakers, voice recognition device and software, and so forth. Information also may be entered into device 400 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

The following clauses and/or examples pertain to further embodiments:

One example embodiment may be a computer executed method comprising providing a scoreboard to keep track of thread dependencies, grouping a set of threads with a common characteristic and when said characteristic is changed, using the grouping to identify threads affected by the characteristic change. The method may also include said characteristic is one of space interpretation or hash function. The method may also include providing a unique identifier for the group. The method may also include keeping track of the number of threads in the group. The method may also include storing said identifier in a thread dependency register. The method may also include providing an additional thread dependency register for said identifier. The method may also include determining a new grouping on each scoreboard address change. The method may also include making each new grouping dependent on the previous grouping. The method may also include limiting a number of groups based on a number of allowed scoreboard address changes. The method may also include using a scoreboard to keep track of an order of execution of critical thread sections in a pixel shader.

In another example embodiment one or more non-transitory computer readable media storing instructions to perform a sequence comprising providing a scoreboard to keep track of thread dependencies, grouping a set of threads with a common characteristic, and when said characteristic is changed, using the grouping to identify threads affected by the characteristic change. The media may further store said characteristic is one of space interpretation or hash function. The media may further store said sequence including providing a unique identifier for the group. The media may further store said sequence including keeping track of the number of threads in the group. The media may further store said sequence including storing said identifier in a thread dependency register. The media may further store said sequence including providing an additional thread dependency register for said identifier. The media may further store said sequence including determining a new grouping on each scoreboard address change. The media may further store said sequence including making each new grouping dependent on the previous grouping. The media may further store said sequence including limiting a number of groups based on a number of allowed scoreboard address changes. The media may further store said sequence including using a scoreboard to keep track of an order of execution of critical thread sections in a pixel shader.

Another example embodiment may be an apparatus comprising a scoreboard to keep track of thread dependencies, group a set of threads with a common characteristic, and when said characteristic is changed, use the thread group to identify threads affected by the characteristic change, and a storage coupled to said scoreboard. The apparatus may include said characteristic is one of space interpretation or hash function. The apparatus may include said scoreboard to provide a unique identifier for the group. The apparatus may include said scoreboard to keep track of the number of threads in the group. The apparatus may include said scoreboard to store said identifier in a thread dependency register. The apparatus may include said scoreboard to provide an additional thread dependency register for said identifier. The apparatus may include said scoreboard to determine a new grouping on each scoreboard address change. The apparatus may include an operating system, a battery and firmware and a module to update said firmware.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A computer executed method comprising:
providing a first thread group identifier to keep track of a first group of pixel shader threads that have address coordinates that are the same, each of said threads also including different individual thread identifiers;
detecting a change of said address coordinates of at least one of said threads as a result of decoupled pixel shading and generating a second thread group identifier for a second group of threads in response to said change of address coordinates, said second group of threads being marked as dependent on said first group of threads;
using the second thread group identifier to identify the pixel shader threads that still have the same address coordinates and to thereby account for said change of address coordinates of said one of said threads of said first thread group; and
retiring each thread group when it no longer has any individual thread identifiers.

2. The method of claim 1 including keeping track of the number of pixel shader threads.

3. The method of claim 1 including storing said first thread group identifier in a thread dependency register.

4. The method of claim 3 including providing an additional thread dependency register for said second thread group identifier.

5. The method of claim 1 including determining a grouping of threads on each change of address coordinates.

6. The method of claim 5 including making each grouping of threads dependent on a previous grouping of threads.

7. The method of claim 1 including limiting a number of groups based on a number of allowed changes of address coordinates.

8. The method of claim 1 including keeping track of an order of execution of critical thread sections during pixel shading.

9. One or more non-transitory computer readable media storing instructions to perform a sequence comprising:
providing a first thread group identifier to keep track of a first group of pixel shader threads that have address coordinates that are the same, each of said threads also including different individual thread identifiers;
detecting a change of said address coordinates of at least one of said threads as a result of decoupled pixel shading and generating a second thread group identifier for a second group of threads in response to said change of address coordinates, said second group of threads being marked as dependent on said first group of threads;
using the second thread group identifier to identify the pixel shader threads that still have the same address coordinates and to thereby account for said change of address coordinates of said one of said threads of said first thread group; and
retiring each thread group when it no longer has any individual thread identifiers.

10. The media of claim 9, said sequence including keeping track of the number of pixel shader threads.

11. The media of claim 9, said sequence including storing said first thread group identifier in a thread dependency register.

12. The media of claim 11, said sequence including providing an additional thread dependency register for said second thread group identifier.

13. The media of claim 9, said sequence including determining a grouping of threads on each change of address coordinates.

14. The media of claim 13, said sequence including making each grouping of threads dependent on a previous grouping of threads.

15. The media of claim 9, said sequence including limiting a number of groups based on a number of allowed changes of address coordinates.

16. The media of claim 9, said sequence including keeping track of an order of execution of critical thread sections during pixel shading.

17. An apparatus comprising:

a processor to provide a first thread group identifier to keep track of a first group of pixel shader threads that have address coordinates that are the same, each of said threads also including different individual thread identifiers, detect a change of said address coordinates of at least one of said threads as a result of decoupled pixel shading and generate a second thread group identifier for a second group of threads in response to said change of address coordinates, said second group of threads being marked as dependent on said first group of threads, and use the second thread group identifier to identify the pixel shader threads that still have the same address coordinates and to thereby account for said change of address coordinates of said one of said threads of said first thread group, retire each thread group when it no longer has any individual thread identifiers; and a storage coupled to said processor.

18. The apparatus of claim 17, said processor to keep track of the number of threads in the group.

19. The apparatus of claim 17, said processor to store said first thread group identifier in a thread dependency register.

20. The apparatus of claim 19, said processor to provide an additional thread dependency register for said second thread group identifier.

21. The apparatus of claim 17, said processor to determine a new grouping on each scoreboard address change.

22. The apparatus of claim 17 including an operating system.

23. The apparatus of claim 17 including a battery.

24. The apparatus of claim 17 including firmware and a module to update said firmware.

* * * * *